Oct. 3, 1933.  R. F. SAMBLESON  1,929,218
OUTLET BOX
Filed April 13, 1932
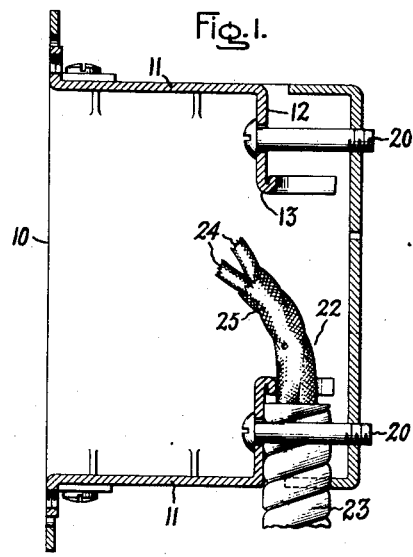
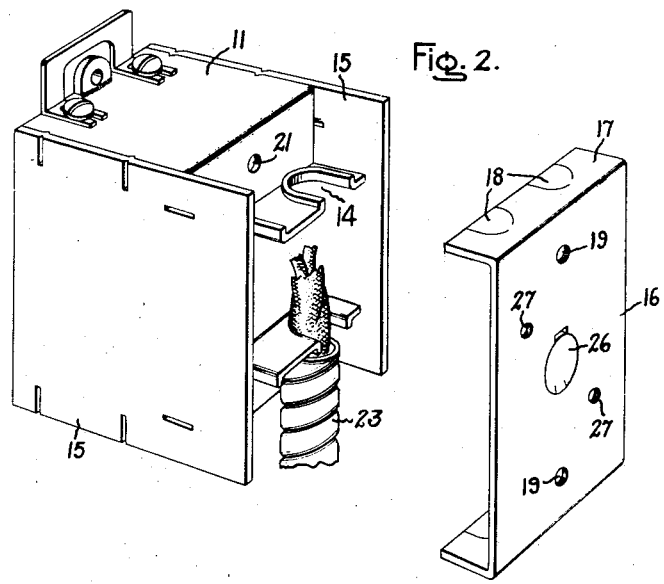
Inventor:
Robert F. Sambleson,
by Charles E. Tullar
His Attorney.

Patented Oct. 3, 1933

1,929,218

UNITED STATES PATENT OFFICE 1,929,218

OUTLET BOX

Robert F. Sambleson, Bridgeport, Conn., assignor to General Electric Company, a corporation of New York Application April 13, 1932. Serial No. 604,956

3 Claims. (Cl. 247—15)

My invention relates to an electric wiring system and more particularly to an outlet or junction box in which connections may be made to the electric circuit.

The object of my invention is to provide an improved outlet or junction box which will simplify the connection of a device to the electric circuit in an electric wiring system and which will at the same time be of simple construction, have few parts, and be of low cost of manufacture.

What I consider to be novel and my invention will be better understood by reference to the following specification and appended claims when considered in connection with the accompanying drawing.

In the accompanying drawing, Fig. 1 is a side view in section of the outlet box of my invention with a cable entering the box and clamped thereto; Fig. 2 is a view in perspective from the rear of the outlet box with the bottom plate removed exposing a cable in position to be secured in the outlet box.

The outlet box is designated generally by the numeral 10. The end walls 11 are formed of a flat plate of metal bent near the bottom to form a surface 12 extending within the box 10 at right angles to the end of the box and having a depending end 13 with arched openings 14. Arched openings 14 are provided with shoulders to present rounded edges to conductors passing through them to prevent damage to the insulation on the conductors. The size of the arched openings 14 is such that they will pass the conductors freely but will serve as stops for the armor of the cables. The side walls 15 are rectangular in shape and extend substantially below the end walls 11. The end walls 11 and side walls 15 are shown welded together but obviously they may be secured in any manner. The bottom of the box 10 is open between the depending ends 13 of the end walls 11 which eliminates the necessity of the knockouts as usually provided in the sides and bottom of the outlet box to permit the insertion of an electric cable. To cover the bottom of the box and to assist in clamping a cable in the box a bottom plate 16 is provided having turned up ends 17 with arched removable portions or twistouts 18 which are in line with the openings 14 in end plates 11 when the bottom plate is in position between side walls 15. It may be desired to provide arched openings in place of twist-outs 18. The bottom plate 16 has threaded openings 19, which screws 20 are adapted to engage to secure the bottom plate 16 adjustably between the side walls 15. Screws 20 pass through openings 21 in the surfaces 12 of end plates 11 and may be adjusted from the front of the box.

A cable 22 is shown entering the box 10 and is of the type having a flexible armor 23 covering two conductors 24 which are separately insulated and then covered by an insulating material 25. Any other type of cable either of the rigid conduit or flexible type might be secured instead of the cable 22 as shown. As shown, the cable is secured between the depending end 13 of end plate 11 and the upturned end of bottom plate 16.

In the installation of this outlet box 10 an opening is first made in the wall and the cable passed through the opening. The box 10 is then prepared for installation in the opening by removal of one of the removable portions 18 of bottom plate 16. The cable is then placed in position in the corresponding arched opening of one of the end walls 11 and secured therein by tightening up the screw 20 on the side to which the cable is to be secured thus bringing the opening made by the removal of the removable portion 18 into close engagement with the covering of the cable. The box may then be secured in the opening in the wall. A plurality of cables may be so secured in the box depending upon the number of arched openings 14 and corresponding arched removable portions 18 which are provided. As shown in the drawing four sets of openings are provided but a greater or lesser number may be provided as desired. A pry-out 26 is provided in the center of bottom plate 16 so the outlet box 10 may be used to provide an outlet for a fixture. The fixture stud may be secured to the center of the bottom plate by means of screws passing through openings 27 in the bottom plate 16.

From the foregoing it may be seen that an improved outlet box is provided which is easy to install, of simple construction and in consequence of low cost of manufacture.

What I claim as new and desire to secure by Letters Patent of the United States, is:

1. An outlet box comprising end walls bent inwardly and having downwardly depending ends with arched openings, side walls extending substantially below said end walls, a bottom plate with turned up ends having arched openings, and means to secure said bottom plate between said side walls whereby a conductor may be clamped between the depending ends of said end walls and the turned up ends of the bottom plate.

2. An outlet box comprising end walls bent inwardly and having downwardly depending ends with arched openings, side walls extending substantially below said end walls, a bottom plate with turned up ends having removable portions in line with the arched openings in said end walls, and adjustable means to secure said bottom plate between said side walls whereby a cable may be secured in an arched opening in said end wall by engagement with a turned up end of said bottom plate.

3. An outlet box comprising end walls bent inwardly and having downwardly depending ends with arched openings, side walls extending substantially below said end walls, a bottom plate with turned up ends having arched removable portions, and screws passing through openings in the end wall and engaging threaded openings in the bottom plate to secure adjustably the bottom plate between said side walls whereby a cable may be secured in an arched opening in said end walls by engagement with a turned up end of said bottom plate.

ROBERT F. SAMBLESON.